United States Patent [19]

Smith et al.

[11] 4,022,516
[45] May 10, 1977

[54] BEARING SPACER AND METHOD

[75] Inventors: Robert L. Smith, Chandler; Joseph A. Goodrich, Tempe, both of Ariz.

[73] Assignee: The Garrett Corporation, Los Angeles, Calif.

[22] Filed: Sept. 24, 1975

[21] Appl. No.: 616,340

[52] U.S. Cl. .............................. 308/199; 308/187
[51] Int. Cl.² .......................................... F16C 1/24
[58] Field of Search .......... 308/199, 187, 200, 217, 308/219, 230

[56] References Cited
UNITED STATES PATENTS 1,209,537  12/1916  Atkins ................................ 308/199

*Primary Examiner*—Joseph F. Peters, Jr.
*Assistant Examiner*—Richard A. Bertsch
*Attorney, Agent, or Firm*—James W. McFarland; Albert J. Miller

[57] ABSTRACT

A bearing spacer of substantially incompressible material having lubricative qualities that is disposed between adjacent bearings in a ball bearing assembly. Axially extending projections on each side of the spacer have upper and lower surfaces that are slidably engageable with the inner and outer races to produce a lubricating film for the bearing assembly, and to inhibit vibration of the spacer.

12 Claims, 6 Drawing Figures

BEARING SPACER AND METHOD

BACKGROUND OF THE INVENTION

This invention relates to antifriction bearing assemblies of the type referred to in U.S. Pat. No. 851,019 of Model, U.S. Pat. No. 860,186 of Beemer, U.S. Pat. No. 1,015,441 of Hess, U.S. Pat. No. 1,209,537 of Atkins, U.S. Pat. No. 3,208,806 of Grolmann et al. More particularly, the present invention provides improvements in structure as illustrated in U.S. Pat. No. 3,712,694 of Smith relating to antifriction bearing spacers of incompressible, lubricative material such as graphite.

Bearing spacers of the type described are normally disposed between the adjacent bearings in a bearing assembly,, such as adjacent steel ball bearings, and have concave end walls in which the ball bearings rotate. Such rotation of the ball bearings plus rotation of the bearing spacer between the inner and outer races of the bearing produces a lubricating film as the spacer wears.

Because of the relatively brittle nature of the material of which the bearing spacer is comprised, e.g., graphite, such spacers are subject to failure by cracking. Such phenomena has been discovered particularly at extremely high bearing speeds of approximately 25,000 rpm and high operating temperatures in the neighborhood of 900° F.

While all the sources of forces which contribute to spacer breakage are not completely known, it is believed that this breakage is primarily due to vibration of the spacers. The primary vibration appears to be induced from the vibrations of the ball bearing members caused by their movement in a somewhat elliptical path about the center line of the races due to necessary manufacturing and machining tolerances. Such elliptical movement at high speeds creates vibration which, combined with the variable axial and radial loading imposed upon the ball bearings, tends to excite the spacer pellets into vibration.

SUMMARY OF THE INVENTION

It is the primary object of the present invention to provide an antifriction bearing apparatus and method wherein vibration of bearing spacers is inhibited to reduce spacer breakage and increase the operational life thereof.

Another important object is to provide method and apparatus relating to a bearing spacer of lubricative qualities which is not subject to substantial excitation and vibration by the adjacent ball bearing members, and which also provides further wear surfaces for producing the lubricating film for the entire bearing assembly.

More particularly, the present invention accomplishes the preceding objects by providing on the sides of the bearing spacer projections which extend axially relative to the inner and outer races of the bearing assembly. The projections present upper and lower surfaces respectively slidably engageable with the outer and inner races to produce the lubricating film. Further, the projections prevent "spinning" of the spacers about their own axis, and by contact with the inner and outer races the projections inhibit vibration of the relatively fragile pellets to avoid breakage thereof. Preferably a pair of stabilizing side projections are included on each bearing spacer, extending oppositely from the cylindrical, circumferentially extending main body of the bearing spacer.

These and other more particular objects and advantages of the present invention are specifically set forth in or will become apparent from the following detailed description of the preferred form of the invention when read in conjunction with the accompanying drawing.

DETAILED DESCRIPTION OF THE PREFERRED EMBODIMENT

Figure 1:
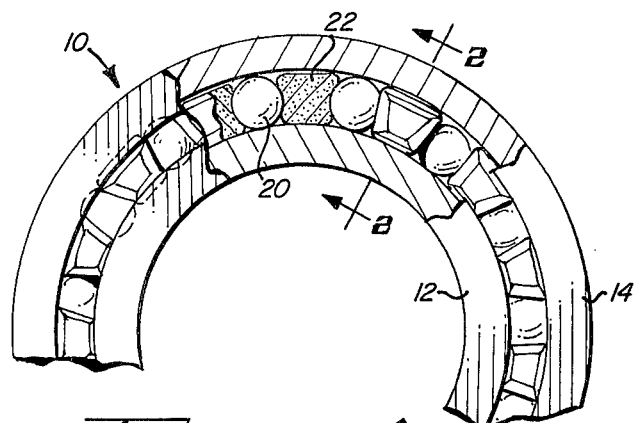
FIG. 1 is a partial plan view of a bearing assembly as contemplated by the present invention, with portions broken away to reveal details of construction.

Referring now more particularly to the drawing, an antifriction bearing as contemplated by the present invention is generally denoted by the numeral 10. Bearing 10 has usual axially extending, concentric, inner and outer circular bearing races 12 and 14 having axially aligned ball carrying grooves 16 on the facing surfaces thereof. Bearing 10 illustrated is an angular contact ball bearing; however, the invention is equally applicable to other types of bearings as well. In the bearing illustrated, the inner race is relieved at one side to provide an axially extending relieved surface 18 to facilitate assembly. The bearing further includes a plurality of steel ball bearing members 20 received for rolling movement in grooves 16 to maintain the races in concentrically spaced, relatively rotatable relationship. In instances where the bearing is utilized in regions of elevated temperatures, under load, and/or at extremely high speeds, as well as under situations of difficult lubricating conditions, spacers are provided between the bearing members 20 to prevent direct contact therebetween and consequent premature deterioration by galling, pitting, sliding, and/or fracturing.

Disposed between each adjoining pair of bearing members 20 is a spacer in the form of a body 22 composed of a substantially incompressible, high temperature resistant material with lubricative characteristics. One such a material found to be highly satisfactory in actual use is carbon graphite.

Each spacer or body 22 has a circumferentially extending main cylindrical surface 24 that spaces the ball bearing members 20 circumferentially about the bearing. Opposed end walls of the cylindrical surface present concave depressions 26 of a diameter substantially equal to that of the adjacent bearing members. The bearing members 20 are rotatable within the associated concave depression 26 to produce a lubricative film as the sacrificial spacer wears.

Preferably, as more particularly described in the above-mentioned U.S. Pat. No. 3,712,694 of Smith, spacers 22 have rounded corner intersections 28 faired smoothly into the end walls. The cylindrical surface 24 is sufficient of length, and the concave depressions are arranged such that the ball elements 20 engage depressions 26 at points spaced slightly from the axial center of the cylindrical surface to thereby prolong the useful life of the spacer and prevent tendency of the spacer to tip, cock, or bind between the races. Also, the cylindrical surface 24 is of a diameter just slightly less than the diameter of the balls 20 to space the body 22 from the grooves 16 to prevent unnecessary restriction to movement of the ball, and for other purposes set forth in the reference patent.

Figure 2:
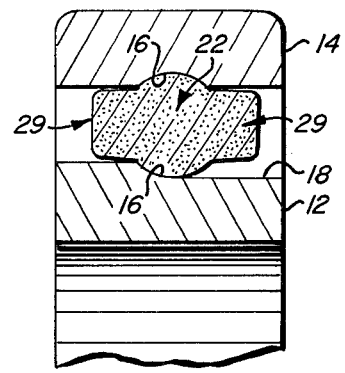
FIG. 2 is a cross-sectional view taken along the radial lines 2—2 of FIG. 1.
Figure 3:
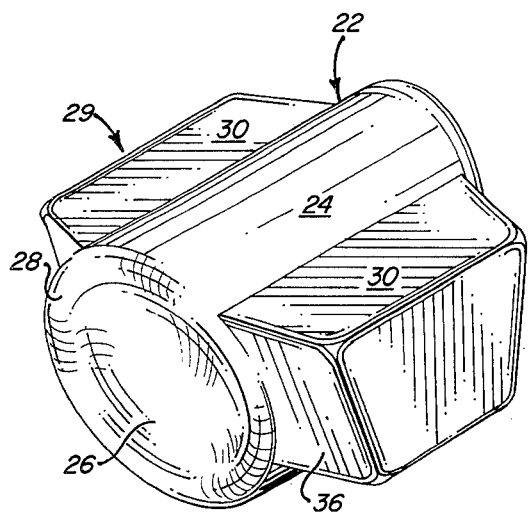
FIG. 3 is a perspective view of a bearing spacer as contemplated by the present invention.
Figure 4:
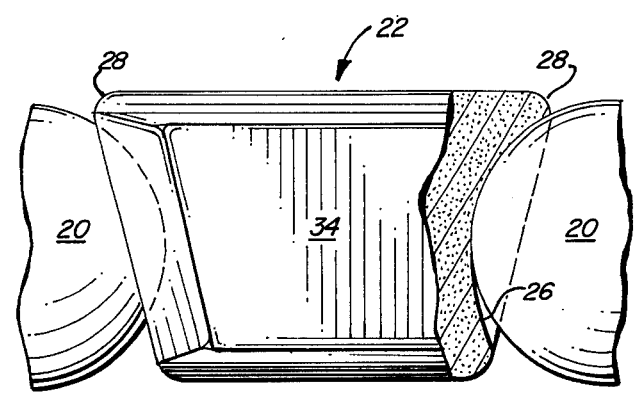
FIG. 4 is an enlarged plan view of a bearing spacer and adjacent bearing members, with portions shown in cross section to reveal details of construction.
Figure 5:
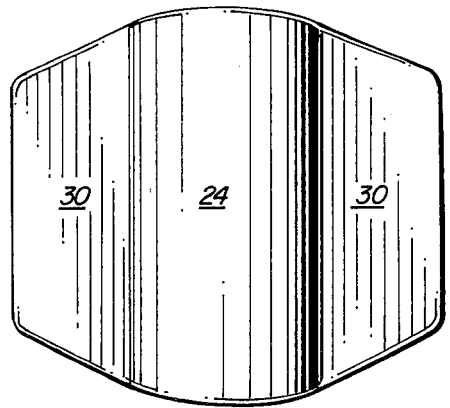
FIG. 5 is a top plan view of the bearing spacer.
Figure 6:
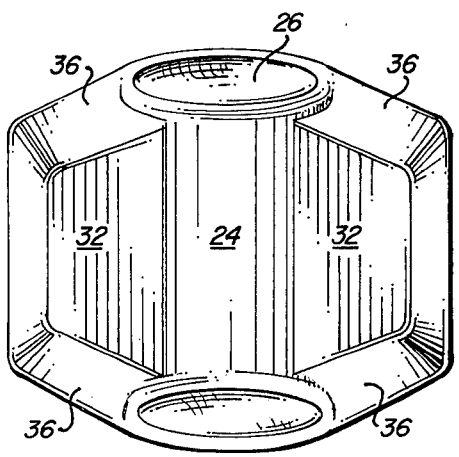
FIG. 6 is a bottom plan view of the bearing spacer.

Spacer body 22 further includes axially extending side projections 29 on opposite sides of cylindrical surface 24 which protrude axially between the inner and outer races as clearly shown in FIG. 2. Each projection 29 presents an upper surface 30 engageable with the outer race 14, a lower surface 32 engageable with inner race 12, and tapered, radially extending side faces 36 at the ends of each projection 29. Each projection further includes a circumferentially extending outer face 34 remote from cylindrical surface 24 and extending substantially parallel thereto. The projections are also tapered in the axial direction such that the outer face 34 is of shorter length in a circumferential direction than cylindrical surface 24. The axial and radial taper arrangement of each projection 29 provides a projection of generally trapezoidal configuration both when viewed from the end as in FIG. 4 and as viewed from the top or bottom as shown in FIGS. 5 and 6. Such configuration of the projection 29 provides maximum surface for sliding contact with the inner and outer races to further produce a lubricating film for the antifriction bearing.

The configuration of the projection and the disposition thereof between the ball bearings tends to reduce vibration of the spacers as well as inhibit rotation thereof about their own central axis. The contact of the upper and lower surfaces 30 and 32 with the respective outer and inner bearing racers inhibits excitation of the bearing spacers by vibration of the adjacent ball bearings. In this manner vibration of the spacers is reduced; stabilization of movement of the spacers results, and yet additional sliding contact area is presented to further the production of the lubricating powder. This particular configuration of the bearing spacer and projections 29 has been found to substantially increase the operating life of the bearing spacers by reducing cracking and breakage thereof.

While the present invention provides projections that stabilize movement of the spacers through the engagement of the upper and lower surfaces with the races, the radial width of the projections 29 is slightly less than the space between the inner and outer racers. As a result of this slightly less radial width, along with the arrangement, clearly illustrated in FIG. 2, wherein the outer facers 34 of the projections are not in engagement with any other part of the bearing, no substantial axial or radial loads are imposed on or carried by the relatively fragile and brittle spacers 22.

From the foregoing it will be apparent that the present invention provides a method of lubricating an antifriction bearing by the steps of emplacing inserts or spacers 22 of the desired lubricative characteristics between adjacent ball bearing members 20, and by allowing these ball bearings to rotate against end walls 26 of the spacers to cause wear of the sacrificial body 22 to produce a lubricating powder or film. Further, the method includes the step of stabilizing movement of the insert bodies 22 to prevent induced vibration by providing the projections 29 which extend in an axial direction substantially perpendicular to the circumferential direction of spacing of the bearing member 20. Projections 29 slidably contact the inner and outer races to further production of the lubricating powder or film.

While a preferred embodiment of the invention has been set forth in detail, the foregoing detailed description should be considered exemplary in nature and not as limiting to the scope and spirit of the invention as set forth in the appended claims.

Having described the invention with sufficient clarity that those skilled in the art may make and use it, we claim:

1. An antifriction bearing comprising:
   an axially extending outer circular bearing race;
   an axially extending inner circular bearing race concentric with said outer race;
   a plurality of bearing members arranged between said bearing races;
   a plurality of cylindrical spacers each having a circumferentially extending cylindrical surface and opposed end walls, said spacers being interposed between said bearing members with said end walls adjacent said bearing members, said cylindrical spacers being formed of a substantially incompressible material having lubricative qualities; and
   a projection on each of said spacers extending axially from said cylindrical surface, said projection having upper and lower axially extending surfaces respectively engageable with said outer and inner races.

2. An antifriction bearing as set forth in claim 1, wherein said projections are comprised of said incompressible material and slidably contact said races to reduce vibration of said spacers and rotation thereof and to produce powder for lubricating said bearing.

3. An antifriction bearing as set forth in claim 2, wherein said spacers have rounded corners formed by the intersection of said cylindrical surfaces and each of said end walls.

4. An antifriction bearing as set forth in claim 3, wherein each of said end walls of said spacers are provided with concave depressions of a diameter substantially equal to the diameter of said bearing members.

5. An antifriction bearing as set forth in claim 4, wherein said spacers are of carbon graphite.

6. An antifriction bearing as set forth in claim 5, further including a pair of said projections on each of said spacers, said pair of projections being disposed on opposite sides of said cylindrical surface and extending axially in opposite directions therefrom, each of said pair of projections having upper and lower axially extending surfaces for engaging said outer and inner bearing races.

7. An antifriction bearing as set forth in claim 1, wherein said upper surface of each spacer is substantially larger than said lower surface.

8. An antifriction bearing as set forth in claim 7, wherein said projection of each spacer has tapered, radially extending side faces.

9. An antifriction bearing as set forth in claim 8, wherein said projection of each spacer has an outer face remote from said cylindrical surface extending parallel thereto in said circumferential direction, said projection being axially tapered whereby said outer face is shorter in said circumferential direction than said cylindrical surface.

10. A spacer for separating bearing members in an antifriction bearing, comprising:

a solid, substantially incompressible body having lubricative characteristics and a generally cylindrical configuration, said body having opposed end walls adapted to receive adjacent ones of said bearing members whereby said body spaces said adjacent bearing members in a first direction; and a projection on said body extending in a second direction substantially perpendicular to said first direction, said projection adapted to cooperate with said antifriction bearing to reduce vibration and rotation of said body, said projection configured and arranged relative to said bearing whereby no substantial loads in said first direction are imposed upon said projection.

11. A spacer as set forth in claim 10, wherein said body is provided with rounded corners connecting the generally cylindrical side of said body extending in said first direction with each of said end walls.

12. A method of lubricating an antifriction bearing having a plurality of bearing members arranged between concentric, inner and outer circular bearing races and subject to vibration during operation of the bearing, comprising the steps of:

emplacing inserts of material having lubricative characteristics between adjacent ones of said bearing members to space the latter in a circumferential direction;

allowing said adjacent bearing members to rotate in concave depressions on opposite end walls of said inserts to cause wear of said inserts to produce a lubricating powder for lubricating said bearing; and stabilizing movement of said inserts to inhibit vibration thereof induced by vibration of said bearing member by providing projections on opposite sides of said inserts extending in an axial direction substantially perpendicular to said circumferential direction for slidably contacting said inner and outer races to inhibit vibration of said inserts and to produce powder for lubricating said bearing.

* * * * *

UNITED STATES PATENT AND TRADEMARK OFFICE
CERTIFICATE OF CORRECTION

PATENT NO. : 4,022,516
DATED : May 10, 1977
INVENTOR(S) : Robert L. Smith; Joseph A. Goodrich It is certified that error appears in the above—identified patent and that said Letters Patent are hereby corrected as shown below:

In the cover page, add the following under the heading "References Cited":

| | | | |
|---|---|---|---|
| 856,209 | 6/1907 | Barthel. | 308/199 |
| 3,220,785 | 11/1965 | Noll et al | 308/199 |
| 3,712,694 | 1/1973 | Smith . | 308/199 |

Signed and Sealed this second Day of August 1977

[SEAL]

Attest:

RUTH C. MASON
*Attesting Officer*

C. MARSHALL DANN
*Commissioner of Patents and Trademarks*